Feb. 16, 1971  J. E. McINTYRE  3,562,859
VACUUM FORMING APPARATUS

Filed March 12, 1968  2 Sheets-Sheet 1

INVENTOR.
JOURNAL E. McINTYRE
BY
Richard O. Church
ATTORNEY

INVENTOR.
JOURNAL E. McINTYRE
BY
Richard O. Church
ATTORNEYS

United States Patent Office 3,562,859
Patented Feb. 16, 1971

3,562,859
VACUUM FORMING APPARATUS
Journal E. McIntyre, Uniondale, N.Y., assignor to Auto-Vac Company, Inc., Tabor City, N.C., a corporation of North Carolina
Filed Mar. 12, 1968, Ser. No. 712,477
Int. Cl. B29c 3/02
U.S. Cl. 18—19
9 Claims

ABSTRACT OF THE DISCLOSURE

Improved apparatus with rapid cycle times is provided for the continuous production of articles by thermoforming techniques. Processes and apparatus savings are achieved by securing the forming die to a table that is mounted for reciprocation in both a vertical and horizontal plane so that the die and the formed article may be moved together from the heating to the cooling station. This enables feed stock to be heated at the same time a formed article is being cooled, and cycle times are greatly reduced.

BACKGROUND OF THE INVENTION

(1) Field of the invention

This invention relates to thermoforming and, more particularly, relates to improved rapid and continuous thermoforming apparatus that provides for the production of shaped articles.

(2) Description of the prior art

Thermoforming techniques have long been known as useful in forming heat softenable plastic sheets into a variety of desired shapes. Conventionally, in these processes, a sheet of heat softenable plastic is clamped in position under a radiant heating device and above a suitable mold or form. The heater is turned on, and, as the plastic sheet becomes softened, it is draped over the mold. The mold is then either lifted into position and/or the clamping frame is brought down over the mold to obtain contact between the mold and the sheet. A vacuum is then drawn in the region between the mold and the softened plastic sheet to cause the sheet to be drawn down into the cavities of the mold. At this time, the heating element is either disconnected or else it is moved, as by sliding on a track, away from the formed plastic article so that the article may cool while in contact with the mold. After the article has cooled sufficiently to be handled, the clamping mechanism or frame is disengaged and the plastic article is withdrawn from the mold.

The above is essentially a batch operation although machinery has been developed that is semicontinuous in that a continuous roll of material may be fed into it. Its operation is similar to that described above except that after an article has been formed and the gripping device has been disengaged, the formed article is drawn in sheet form away from the molding area, which draws a fresh portion of the sheet of material into the working area. The heating element is then turned on or slid into position over the newly entered portion of the plastic sheet and the cycle is repeated. The draw-off means causes the sheet to advance so that the originally formed articles reach a cutting station with other portions of the sheet being drawn sequentially behind. A cutting device is then used to sever the first section of the formed article from the rest of the continuous sheet.

The prior art apparatus such as discussed above is subject to certain inherent limitations that considerably reduce the speed of the operation. It can be understood that since the heating and cooling take place at the forming station, the process is only semicontinuous and an operating cycle cannot be faster than the total time required by both the heating and the cooling cycle. Apparatus of this sort is somewhat difficult to construct since the plastic sheet, when softened, must also be held in tension to prevent shrinkage. This is primarily accomplished by means of the clamping frame that generally opens and closes in a clam shell-like motion. However, when the clamping frames are opened, a secondary clamping means must be provided to secure the sheet as by means of a gripping element transverse to the direction of advance. All of these mechanisms may prove unduly cumbersome and require considerable adjustment to provide for their synchronization in automatic operation.

SUMMARY OF THE INVENTION

Accordingly, it is an object of this invention to provide improved thermoforming apparatus that may be operated on a more nearly continuous basis than that known to the prior art.

Another object of this invention is to provide a thermoforming device of improved capacity having greatly reduced cycle time.

Another object of this invention is to provide improved and simplified thermoforming apparatus that has greater flexibility with respect to the size and shape of articles that may be formed therewith.

Still a further object of this invention is to provide a greatly simplified and comparatively inexpensive thermoforming device that has comparatively short cycle times, that is fully automatic in operation, and which may accommodate the manufacture of many different sizes and shapes of articles.

BRIEF STATEMENT OF THE INVENTION

Briefly, these and other objects of this invention are achieved by mounting the mold on a table that is adapted to be reciprocated both in a vertical and horizontal direction. By this means, after the article has been formed but before it is cooled, the formed article, while in registry with the mold, is cycled to a cooling station, and simultaneously therewith a new portion of plastic film is drawn into the heating zone. After the articles have sufficiently cooled, the table and mold are reciprocated downwardly to disengage from the article, then reciprocated horizontally to a position subjacent the plastic film being heated and then reciprocated upwards to enable the heated film to drape over the mold. By these means, both the heating and cooling can take place simultaneously with an attendant increase in the speed and efficiency of the apparatus.

DESCRIPTION OF THE DRAWINGS

The invention may better be understood in connection with the accompanying drawings in which:

With reference to FIG. 1, there is generally shown a preferred apparatus for practicing this invention. A mold 1 is shown as mounted on a table 2 that in turn is mounted on a pedestal 3. The pedestal 3 includes a telescoping section 4 that may be actuated by a piston 6 to reciprocate the table 2 and the mold 1 in a vertical direction. The pedestal 3 is supported on a base that is grooved to receive the guide rails of a stationary bench support 9. An air piston 11 is mounted at one end of the bench 9 and has a piston rod 12 extending therefrom that engages one side of the pedestal. By this means, the piston 11 may be used to cause the base 7 and pedestal 3 to reciprocate in a horizontal plane by sliding in the guide rails 8 of the bench support 9. The bench support 9 also includes two adjustable stops 13 that may control the extent of horizontal travel of the base 7 and pedestal 3.

Figure 1:
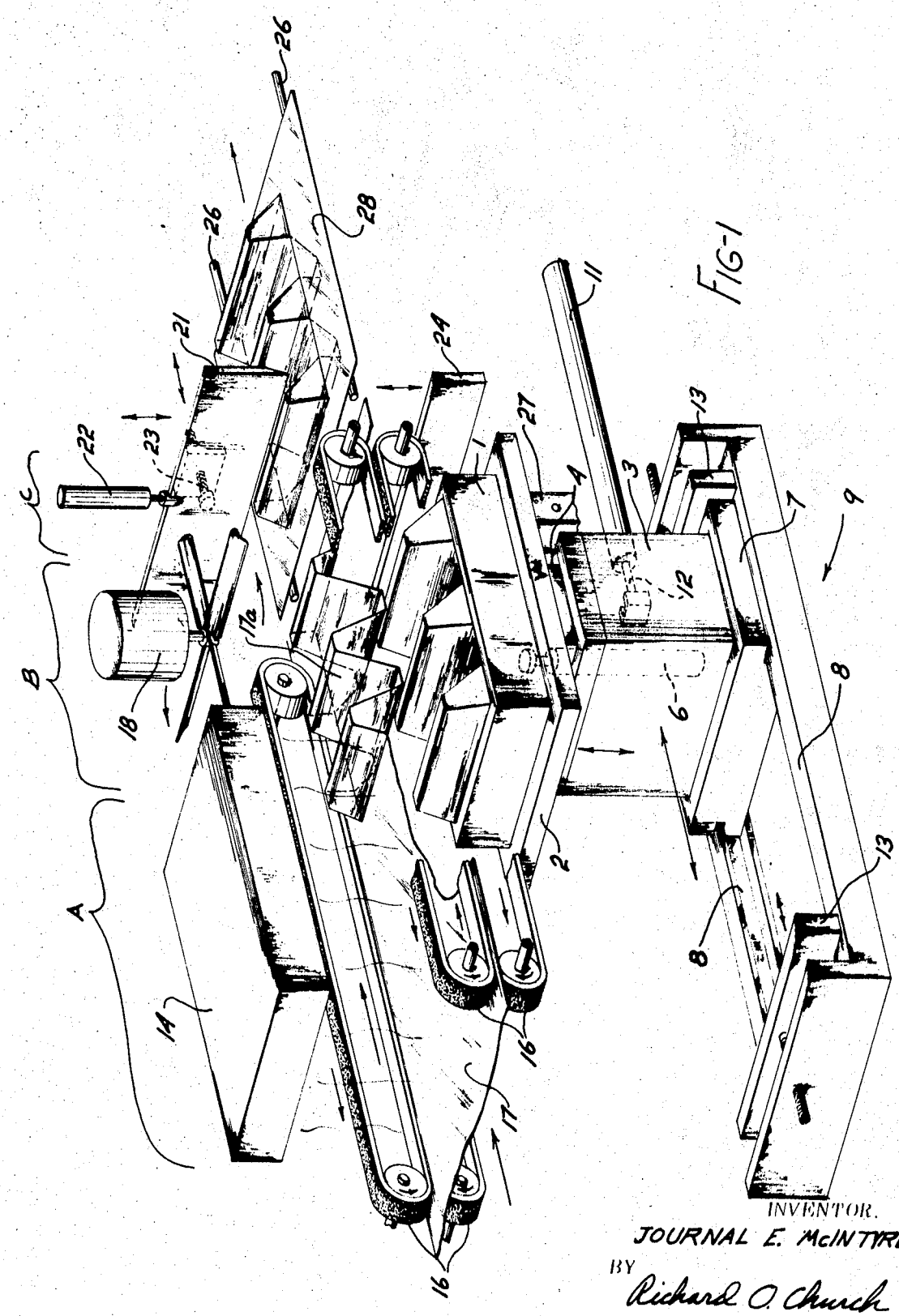
FIG. 1 is a somewhat schematic, partly cut away, perspective view of a preferred apparatus for practicing the instant invention.

When the pedestal 3 is moved to the extreme left hand position as shown in FIG. 1, the mold 1 is positioned directly below a heating station A. This heating station A includes a heating element 14, preferably of the radiant type, and clamping means 16, here shown as two pairs of endless belts, adapted to engage the side edges of a continuous sheet of plastic 17.

Figure 2:
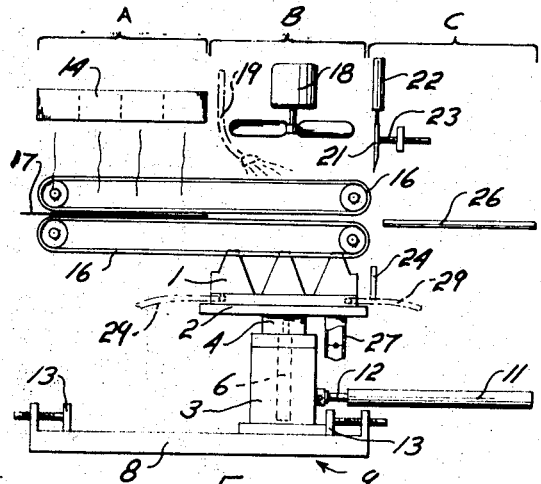
FIGS. 2–7 are schematic views, in side elevation, of the apparatus of FIG. 1 illustrating six different sequential operations in the functioning of the apparatus.

When the pedestal 3 is moved to its extreme right hand position as shown in FIG. 1, it will be positioned immediately below a cooling station B. This cooling station B includes cooling means which may be a fan 18, as shown in FIG. 1, or a water spray 19, as schematically illustrated in FIG. 2. The clamping means extends between the heating station A and terminates adjacent the exit of the cooling station B.

Immediately adjacent the terminus of the clamping means is located a cutting station C. This is comprised of a cutting blade 21 adapted to reciprocate in a vertical plane through an action of an air cylinder 22. The horizontal position of the cutting blade 21 may be adjusted by means of a suitable adjustment device 23.

Located directly below the cutting blade is an anvil 24. While not so illustrated in the drawings, the anvil 24 is also adapted for vertical reciprocating movement and has adjustment means (not shown) so that it may be moved in a horizontal plane to register in alignment with the cutting blade 21. Immediately downstream from the cutting blade 21 and the anvil 24 is located support means 26, here shown as two spaced parallel rods, for supporting a sheet of material that has been formed by the vacuum forming device.

The cycle of operation of this device can best be understood with reference to FIGS. 2–7. FIG. 2 represents the initial start-up of the apparatus where a continuous sheet or film 17 of heat formable plastic material has engaged the clamping belts 16—16 and has been moved into position under the heater 14 at the heating station A. The mold 1 is retracted to its lower position and is horizontally disposed beneath the cooling station B.

Figure 3:
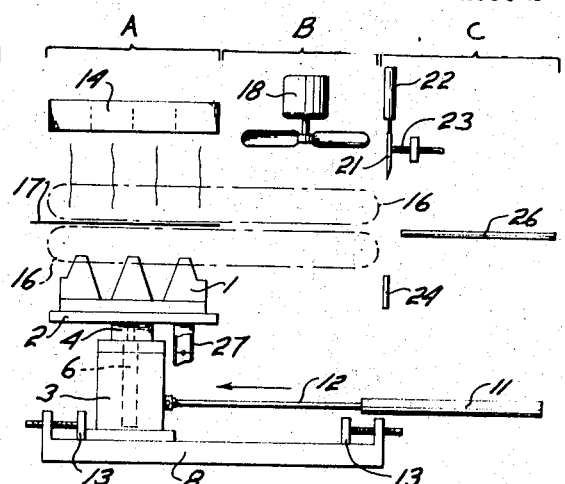

As the sheet of plastic 17 is being heated at the heating station A, the pedestal 3 is moved, by means of the horizontal air cylinder 11 and the piston rod 12, to a position directly beneath the plastic sheet 17 (see FIG. 3).

Figure 4:
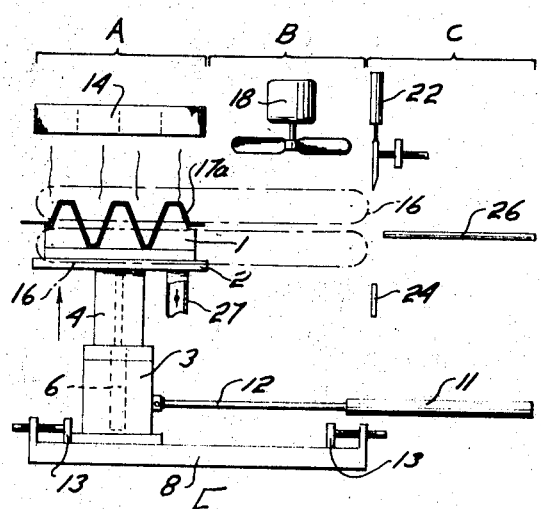
Figure 5:
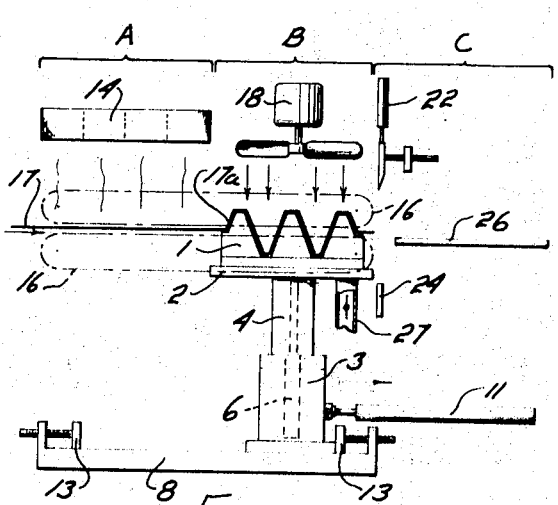

In FIG. 4, the plastic sheet 17 has been heated sufficiently so that it is soft and deformable. At this time, the vertical air cylinder 6 causes the table and the mold to raise into a position where the softened plastic sheet 17 will drape over the mold 1. A vacuum is then drawn by means of vacuum line 27 in the space between the upper surface of the mold 1 and the lower surface of the plastic sheet 17, causing the sheet 17 to be drawn into intimate contact with and into the recesses of the mold 1. As soon as this has been accomplished, and without waiting for the heat formed plastic aritcle 28 to cool, the horizontal air cylinder 11 is retracted to cause the mold to move away from the heating station A and into position at the cooling station B. At the same time, a fresh supply of plastic sheet 17 is advanced into the heating station due to the movement of the clamping belts 16—16 and the table 2. As shown in FIG. 5, the mold 1 and the formed sheet 17a are now positioned directly beneath the fan 18 where the formed sheet 17a can be cooled and fully solidified. While this cooling is taking place, the plastic sheet newly drawn into position at the heating station A begins to soften by the influence of the heater 14.

Figure 6:
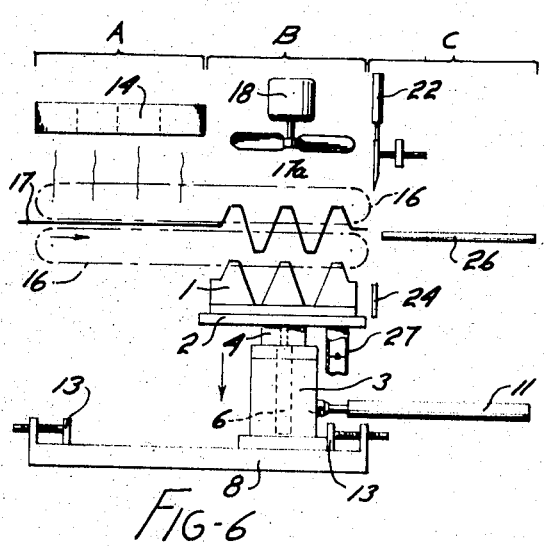
Figure 7:
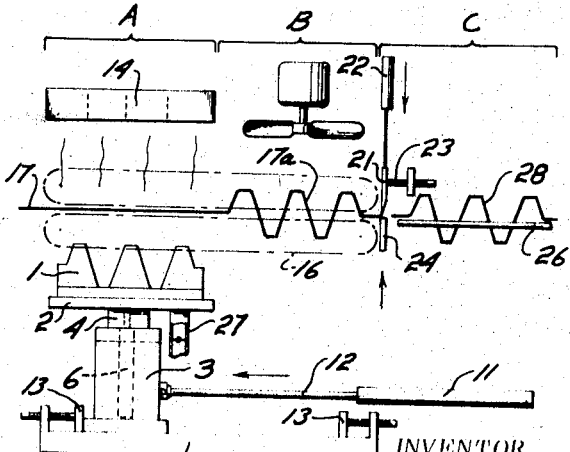

As soon as the formed sheet 17a is cooled sufficiently to be self-supporting, the vertical air cylinder 6 retracts the mold 1 from contact with the formed sheet 17a into a lowered disengaged position as shown in FIG. 6. At this point, the cycle begins to repeat: the mold 1 moves into position at the heating station A as shown in FIG. 3, the mold 1 is raised into contact with the softened film 17, as in FIG. 4, a vacuum is drawn through line 27 and the formed plastic sheet 17a is advanced into position at the cooling station B as shown in FIG. 5. At this time, a previously formed portion 28 of the plastic sheet 17a will be advanced out of the cooling station and will be supported by the support rods 26 as shown in FIG. 7. While held in this position, the cutting blade 21 and the anvil 24 are reciprocated into engaging relationship with the formed plastic film 17a from opposite sides in order to sever the formed article 28 from the formed plastic sheet 17a at the cooling station B.

It can be understood that the above cycle of operation can be repeated indefinitely until the desired quantity of articles have been manufactured. While not shown in the drawings, it will be readily apparent to anyone skilled in the art that automatic timing controls can readily be adapted to control the operation of the vertical and horizontal pistons, the cutting blade, the movement of the gripping belts, and other moving parts of the apparatus.

It should be noted that it is generally desirable to maintain the mold 1 at temperatures above room temperature but below the softening point of the plastic sheet. However, as the mold 1 may become too hot during operation due to the time it is positioned at the heating station, it is useful to provide for the circulation of water through the mold by means of fittings 29.

As shown in the drawings, the cutting blade 21 and anvil 24 are both mounted for reciprocation. This is advantageous, though not entirely necessary, since it permits articles that are formed by a deep draw into a female portion of the mold to clear the anvil 24 when leaving the cooling station B. However, if the mold 1 contains only male portions and has a smooth lower surface, movement of the anvil 24 is not required.

The invention has been described above with respect to gripping elements comprised of two pairs of endless belts 16—16. In another embodiment of this invention, only the upper belts are used and the plastic sheet is gripped between such upper pair of belts and the outer portion of the mold 1 or table 2. By these means, the endless belts will follow the movement of the mold 1 and table 2 and thus not require a drive mechanism or means to synchronize the movement of the gripping belts with the movement of the mold 1 and table 2.

In the above description of the drawings, the use of an air line 27 was discussed in reference to drawing a vacuum on the underside of the softened plastic sheet. This air line 27 is also of utility, as is well known in the prior art, for introducing air under pressure beneath the formed sheet 17a to help release it from the mold.

As shown in the drawings, the gripping elements 16—16 are belts. It can be appreciated that other equivalent devices such as chains, pin chains, or the like, could also be used.

Another advantage that accrues in the practice of this invention lies in the fact that more positive control over the heating cycle can be obtained since it is possible to make use of slower heating. Since the plastic sheet begins heating while the formed sheet 17a is cooling, it is not necessary to maintain fast cycle times to heat the newly fed sheet with the same rapidity. For this reason, a slightly slower or more gentle heat may be used that presents less danger of degradation or destruction of the plastic film being heated.

Although certain embodiments of this invention have been shown in the drawings and described in the specification, it is to be understood that the invention is not limited thereto, is capable of modification, and can be rearranged without departing from the spirit and scope of the invention.

I claim:

1. Apparatus for vacuum forming articles from a heat-softenable resin sheet comprising:

a table adapted to receive and support a mold of desired configuration;

a first station including means to heat the sheet;

a second station adapted to cool the sheet;

gripping means adapted to engage marginal surfaces of the sheet and advance the sheet, while so gripped, from the first station to the second station;

means mounting the table for reciprocal movement toward and away from the sheet;

means mounting the table for reciprocal movement from a position at the first station to a position at the second station;

first means for reciprocating the table toward and away from the sheet;

second means for reciprocating the table between the first station and the second station.

2. Apparatus according to claim 1 including a cutter adjacent the exit of the second station, the cutter including a cutting reciprocating blade and an anvil.

3. Apparatus according to claim 1 including vacuum means to draw the sheet into intimate contact with the upper surface of the mold.

4. Apparatus according to claim 1 in which the gripping means is a pair of endless belts.

5. Apparatus according to claim 1 in which the gripping means includes an endless belt on one side and a portion of the table on the other side.

6. Apparatus according to claim 1 in which the table is mounted on a pedestal for reciprocating movement toward and away from the sheet and the pedestal is mounted for reciprocal movement between the first station and the second station.

7. Apparatus according to claim 6 in which the reciprocal movement of the table toward and away from the sheet is in a generally vertical direction, and in which the reciprocal movement of the pedestal between the first station and the second station is in a generally horizontal direction.

8. Apparatus according to claim 7 including means to adjust the horizontal travel of the pedestal.

9. Apparatus according to claim 7 including means to adjust the vertical travel of the table relative to the pedestal.

References Cited

UNITED STATES PATENTS

| | | | |
|---|---|---|---|
| 2,976,658 | 3/1961 | Kostur | 18—190UX |
| 3,025,566 | 3/1962 | Kostur | 18—19F |
| 3,081,491 | 4/1963 | Blads | 18—19F |
| 3,134,350 | 5/1964 | Danly et al. | 18—16EX |
| 3,153,813 | 10/1964 | Swick | 18—19F |
| 3,268,952 | 8/1966 | Shelby | 18—19F |
| 3,273,203 | 9/1966 | Ross | 18—19F |
| 3,329,995 | 7/1967 | O'Brien et al. | 18—19PX |
| 3,331,908 | 7/1967 | Shelby | 18—19FX |

JAMES M. MEISTER, Primary Examiner